US012589645B2

(12) United States Patent (10) Patent No.: US 12,589,645 B2
Usa (45) Date of Patent: Mar. 31, 2026

(54) ELECTRIC APPARATUS

(71) Applicant: SUZUKI MOTOR CORPORATION, Hamamatsu (JP)

(72) Inventor: Kazutoshi Usa, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 460 days.

(21) Appl. No.: 18/181,191

(22) Filed: Mar. 9, 2023

(65) Prior Publication Data

US 2023/0302893 A1     Sep. 28, 2023

(30) Foreign Application Priority Data

Mar. 25, 2022    (JP) ................................. 2022-049953

(51) Int. Cl.
| | |
|---|---|
| *B60K 11/06* | (2006.01) |
| *B60K 1/00* | (2006.01) |
| *B60K 11/08* | (2006.01) |

(52) U.S. Cl.
CPC .............. *B60K 11/06* (2013.01); *B60K 11/08* (2013.01); *B60K 2001/006* (2013.01)

(58) Field of Classification Search
CPC .. B60K 11/06; B60K 11/08; B60K 2001/006; B60K 1/04; B60K 2001/003; B60K 2001/005; B60K 1/00; B60Y 2200/124; B60Y 2400/61; B60Y 2410/10
See application file for complete search history.

(56) References Cited

U.S. PATENT DOCUMENTS

| | | | | |
|---|---|---|---|---|
| 2014/0299393 A1* | 10/2014 | Matsuda | ................. | B60L 50/64 |
| | | | | 180/65.1 |
| 2017/0113634 A1* | 4/2017 | Tanaka | ................... | B62M 23/02 |

FOREIGN PATENT DOCUMENTS

| | | | | | |
|---|---|---|---|---|---|
| JP | 2006278201 A | * | 10/2006 | ......... | H01M 50/249 |
| JP | 2011162152 A | * | 8/2011 | ............. | B62J 50/30 |
| JP | 2012-101702 A | | 5/2012 | | |
| JP | 2012096594 A | * | 5/2012 | ............. | H02K 5/00 |
| JP | 2021-66291 A | | 4/2021 | | |
| WO | WO-2007043691 A1 | * | 4/2007 | ......... | H01G 11/18 |
| WO | WO-2013089503 A1 | * | 6/2013 | ......... | H01M 50/249 |
| WO | WO-2014102846 A1 | * | 7/2014 | ........... | B60L 15/007 |
| WO | WO-2014102848 A1 | * | 7/2014 | ............. | B60K 1/00 |
| WO | WO-2014102854 A1 | * | 7/2014 | ............. | B60L 50/51 |
| WO | WO 2021/145276 A1 | | 7/2021 | | |
| WO | WO-2024225210 A1 | * | 10/2024 | ............ | H02K 11/33 |

OTHER PUBLICATIONS

Notice of Reasons for Refusal dated Aug. 26, 2025, issued by the Japanese Patent Office in corresponding application JP 2022-049953.

* cited by examiner

*Primary Examiner* — Drew J Brown
(74) *Attorney, Agent, or Firm* — Stein IP, LLC

(57) ABSTRACT

An electric apparatus installed in an electric vehicle, the electric apparatus includes a plurality of electrical devices including an electrical drive system, and an accommodation case accommodating the plurality of electrical devices. An intake port and a discharge port for cooling air are formed at an upper surface of the accommodation case, and a cooling fan is provided at the intake port or the discharge port.

6 Claims, 5 Drawing Sheets

ELECTRIC APPARATUS

CROSS-REFERENCE TO RELATED APPLICATIONS

The disclosure of Japanese Patent Application No. 2022-049953 filed on Mar. 25, 2022, including specification, drawings and claims is incorporated herein by reference in its entirety.

TECHNICAL FIELD

The present disclosure relates to electric apparatus.

BACKGROUND ART

In an electric vehicle, electric power is supplied from a battery to an electric motor via a drive unit in accordance with an accelerator operation. As an electric vehicle of this type, there is known an electric vehicle in which a drive unit is installed behind a battery and an electric motor is installed behind the drive unit (for example, see Patent Literature 1). In the electric vehicle of Patent Literature 1, the drive unit is sandwiched by the battery and the electric motor from the front and rear. Therefore, a duct is disposed from a vehicle front portion toward the drive unit, and the drive unit is cooled by traveling wind taken in from the duct.

Patent Literature 1: JP2021-66291A

In the electric vehicle described in Patent Literature 1, electrical devices such as a battery, a drive unit, and an electric motor are exposed to the outside. For this reason, a cooling property of each electrical device is enhanced by the traveling wind, but a waterproof property of each electrical device cannot be sufficiently obtained when a vehicle travels on a submerged road surface or the like.

The present disclosure has been made in view of the above, and an object of the present disclosure is to provide electric apparatus capable of achieving both high waterproof property and high cooling property of a plurality of electrical components.

SUMMARY

According to an aspect of the present disclosure, there is provided electric apparatus installed in an electric vehicle, the electric apparatus including a plurality of electrical devices including an electrical drive system, and an accommodation case accommodating the plurality of electrical devices, in which an intake port and a discharge port for cooling air are formed at an upper surface of the accommodation case, and a cooling fan is provided at the intake port or the discharge port.

BRIEF DESCRIPTION OF DRAWINGS

Exemplary embodiment(s) of the present disclosure will be described in detail based on the following figures, wherein.

DESCRIPTION OF EMBODIMENTS

An electric apparatus according to an aspect of the present disclosure is installed in an electric vehicle. A plurality of electrical devices include an electrical drive system, and the plurality of electrical devices are accommodated in an accommodation case. Since the plurality of electrical devices are covered with the accommodation case, even when the electric vehicle travels on a submerged road or the like, water intrusion into each electrical device is prevented. In addition, an intake port and a discharge port for cooling air are formed at an upper surface of the accommodation case, and a cooling fan is provided at the intake port or the discharge port. Even if the plurality of electrical devices are covered with the accommodation case, each electrical device is cooled by the cooling air taken into the accommodation case from the intake port. Therefore, it is possible to achieve both a high waterproof property and a high cooling property of the electric apparatus.

Embodiment

In general, a plurality of electrical devices including an electrical drive system are mounted on a vehicle body frame of an electric vehicle. An exterior component such as a cowl or a cover is attached to the vehicle body frame, but a vehicle lower portion is not covered with the exterior component. For this reason, when the electric vehicle travels on a submerged road surface or the like, there is a possibility that each electrical device inside the exterior component is immersed in water. By accommodating each electrical device in the case, the waterproof property can be enhanced, but traveling wind is less likely to hit the electrical device, and the cooling property deteriorates. As described above, there is a trade-off relationship between the cooling property and the waterproof property of the electrical device, and it is required to achieve both the cooling property and the waterproof property of the electrical device.

Figure 1:
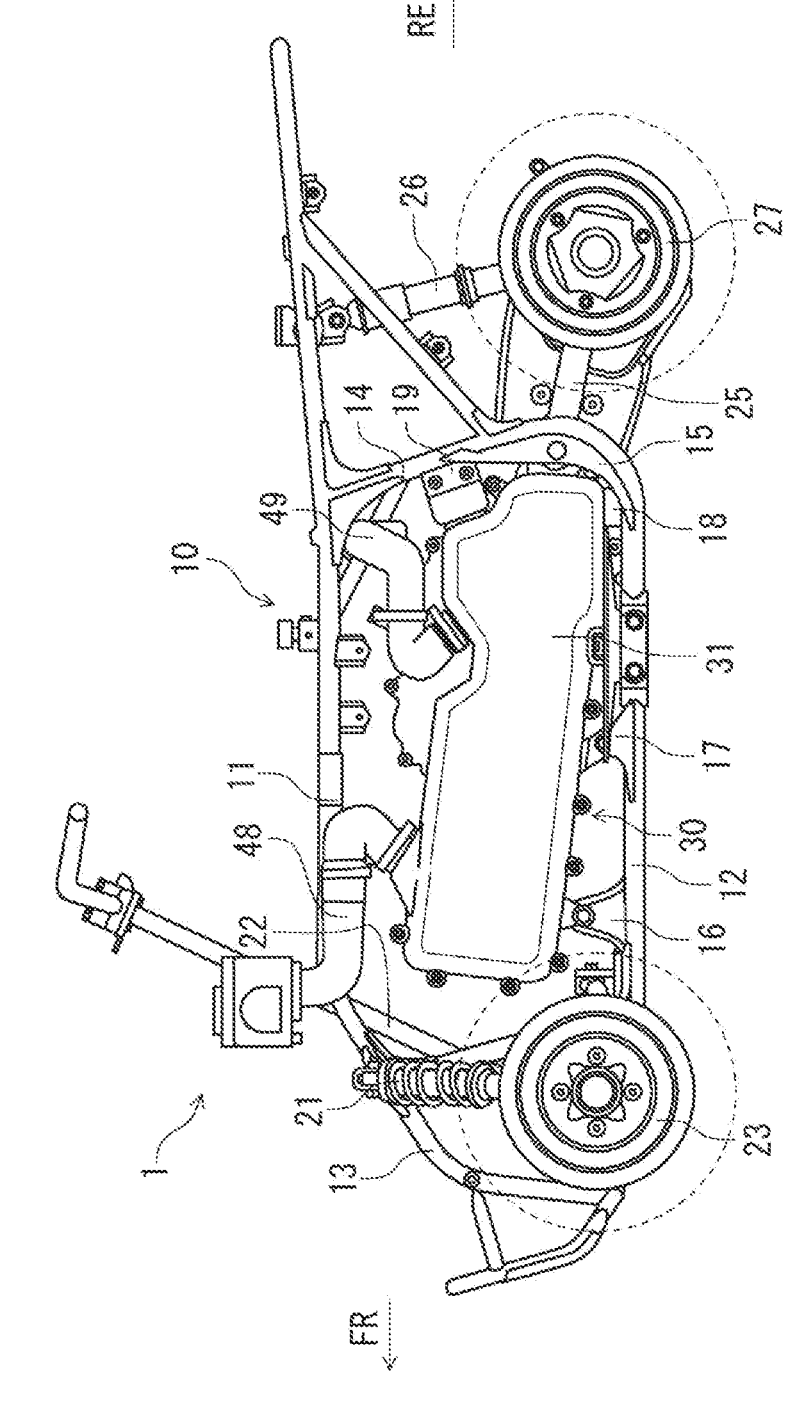
FIG. 1 is a left side view of an electric vehicle according to a present embodiment.

Hereinafter, an embodiment will be described in detail with reference to the accompanying drawings. FIG. 1 is a left side view of an electric vehicle according to the present embodiment. In the following description, an all terrain vehicle (ATV) will be described as an example of the electric vehicle, but the type of the electric vehicle is not particularly limited. In the following drawings, an arrow FR indicates a vehicle front side, an arrow RE indicates a vehicle rear side, an arrow L indicates a vehicle left side, and an arrow R indicates a vehicle right side.

As shown in FIG. 1, the electric vehicle 1 is configured by mounting electric apparatus 30 inside a vehicle body frame 10. The vehicle body frame 10 is formed in a cradle shape in which a pair of left and right upper frames 11 and a pair of left and right lower frames 12 are connected by a pair of left and right front frames 13 and a pair of left and right rear frames 14. A pair of left and right front wheels 23 are supported by the pair of left and right front frames 13 via suspension arms (not shown) and front suspensions 21. A steering shaft 22 is supported by the front frame 13, and each of the front wheels 23 is steered to the left and right by operating the steering shaft 22.

A swing arm 25 is swingably supported by a pivot plate 15 of the rear frame 14. The swing arm 25 extends rearward from the pivot plate 15, and a rear portion of the swing arm 25 is connected to the upper frame 11 via a rear suspension 26. A pair of left and right rear wheels 27 is supported by a rear portion of the swing arm 25 via a rear shaft (not shown). A rear sprocket (not shown) of the rear wheel 27 is connected to an electric motor 63 (see FIG. 3) of the electric apparatus 30 via a chain (not shown), and the rear wheel 27 is rotated by the electric motor 63 via the chain.

A lower portion of the electric apparatus 30 is attached to suspension portions 16 to 18 of the lower frame 12, and a rear portion of the electric apparatus 30 is attached to a suspension portion 19 of the rear frame 14. The electric apparatus 30 is unitized with a plurality of electrical devices accommodated in one accommodation case 31, and the waterproof property of the plurality of electrical devices are enhanced by the accommodation case 31. An intake duct 48 is attached to a front side of an upper surface of the accommodation case 31, and a discharge duct 49 is attached to a rear side of the upper surface of the accommodation case 31. The cooling property of the plurality of electrical devices in the accommodation case 31 are enhanced by the cooling air flowing from the intake duct 48 toward the discharge duct 49.

Figure 2:
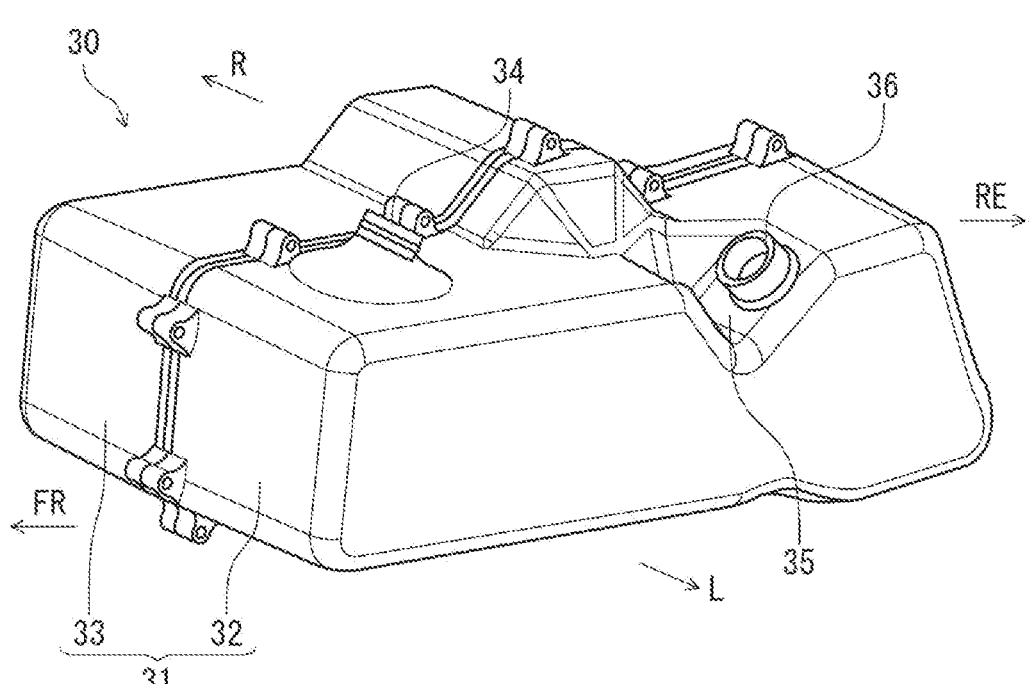
FIG. 2 is a perspective view of electric apparatus according to the present embodiment.
Figure 3:
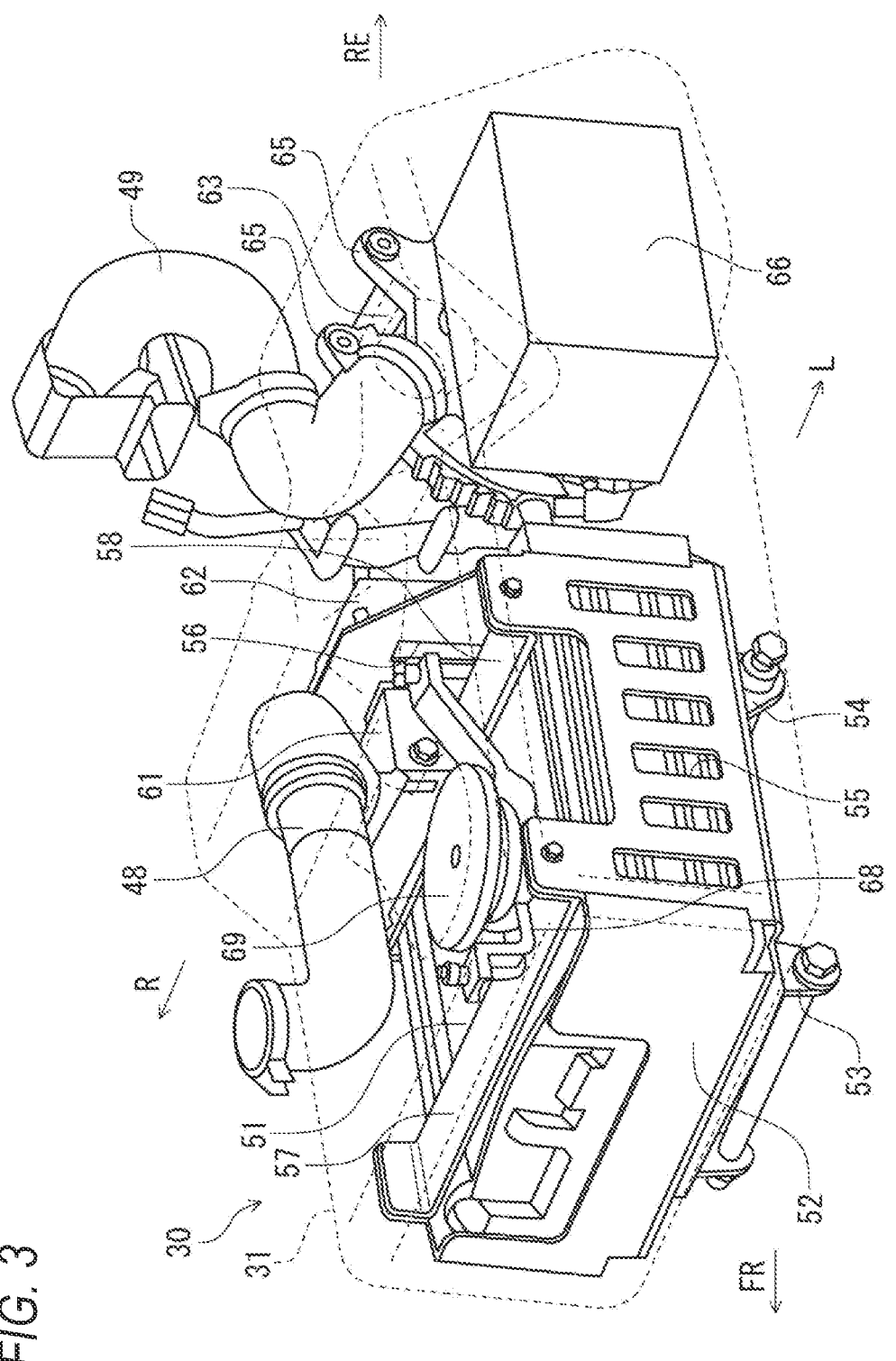
FIG. 3 is a perspective view of electrical devices in an accommodation case according to the present embodiment.

The details of the electric apparatus will be described with reference to FIGS. 2 and 3. FIG. 2 is a perspective view of the electric apparatus according to the present embodiment. FIG. 3 is a perspective view of the electrical devices in the accommodation case according to the present embodiment. In FIG. 3, the accommodation case is indicated by a broken line for convenience of explanation.

As shown in FIG. 2, the accommodation case 31 of the electric apparatus 30 has a left and right split structure, and includes a left case half body 32 and a right case half body 33. An intake port 34 for the cooling air is formed at a front side of an upper surface of the left case half body 32. A rear side of the upper surface of the left case half body 32 is recessed in a V shape in a side view, and a discharge port 36 for the cooling air is formed at a rear inclined surface 35 of the recess. A right side of the recess of the left case half body 32 bulges from upper surfaces of the right case half body 33 and the left case half body 32, and an accommodation space of the accommodation case 31 is widened by a bulging portion. A rear side of the right case half body 33 is formed to be narrow, and a motor sprocket (not shown) is exposed on the rear side of the right case half body 33.

As shown in FIG. 3, the accommodation case 31 of the electric apparatus 30 accommodates the plurality of electrical devices including the electrical drive system, such as a battery 51, a DC-DC converter 61, a controller 62, the electric motor 63, and an inverter 66. A battery holder 52 is installed on a front side of the accommodation space of the accommodation case 31. The battery holder 52 is formed in a box shape having an open upper surface, and the battery 51 is held inside the battery holder 52. Holder fixing portions 53, 54 are formed in a lower portion of the battery holder 52, and the holder fixing portions 53, 54 protrude outward from the accommodation case 31 and are fixed to the suspension portions 16, 17 (see FIG. 4) of the lower frame 12.

A plurality of openings 55 are formed in a side surface of the battery holder 52, and the side surface of the battery 51 is exposed laterally from the plurality of openings 55. A battery case of the battery 51 is formed in a rectangular parallelepiped shape, and a plurality of battery cells are accommodated in the battery case. The plurality of battery cells are charged with electric power for traveling, and the electric power is supplied from the battery cells to the electric motor 63. A pair of front and rear bridge plates 57, 58 are fixed to an upper portion of the battery holder 52 so as to traverse above the battery 51. A cushion material (not shown) is interposed in a portion between each of the bridge plates 57 and 58 and the battery 51.

The DC-DC converter 61 is installed on a right side of an upper surface of the rear bridge plate 58. A voltage of the DC electric power output from the battery 51 is transformed by the DC-DC converter 61. At the rear of the DC-DC converter 61, the controller 62 is installed at a rear surface of the battery holder 52. Each part of the vehicle is controlled by the controller 62, and the inverter 66 is controlled in accordance with an accelerator operation. A predetermined gap is provided between the rear surface of the battery holder 52 and the controller 62, and a plurality of openings 56 are formed in the rear surface of the battery holder 52 facing the controller 62.

The electric motor 63 is installed on a rear side of the accommodation space of the accommodation case 31. Motor fixing portions 64, 65 (see FIG. 4 for the motor fixing portions 64) are formed in a lower portion and a rear portion of a motor case of the electric motor 63, and suspension portions 18, 19 (see FIG. 4) of the lower frame 12 and the rear frame 14 are fixed to the motor fixing portions 64, 65. The inverter 66 is fixed to a left side of the electric motor 63, and the electric motor 63 and the inverter 66 are integrated. The DC electric power of the battery 51 is converted into AC electric power by the inverter 66, and the electric motor 63 is driven to rotate. The electric vehicle 1 (see FIG. 1) travels by rotational driving of the electric motor 63.

A cooling fan 69 is attached to the accommodation case 31 via a bracket 68, and the cooling fan 69 is provided at the intake port 34 (see FIG. 2) of the accommodation case 31. The intake duct 48 is connected to the intake port 34, and the cooling air is taken into the accommodation case 31 through the intake duct 48 by the cooling fan 69. The discharge duct 49 is connected to the discharge port 36 (see FIG. 2) of the accommodation case 31, and the cooling air in the accommodation case 31 is discharged to the outside through the discharge duct 49. As described above, the cooling air flows from the intake duct 48 of the accommodation case 31 toward the discharge duct 49, so that each electrical device such as the battery 51 is cooled.

Figure 4:
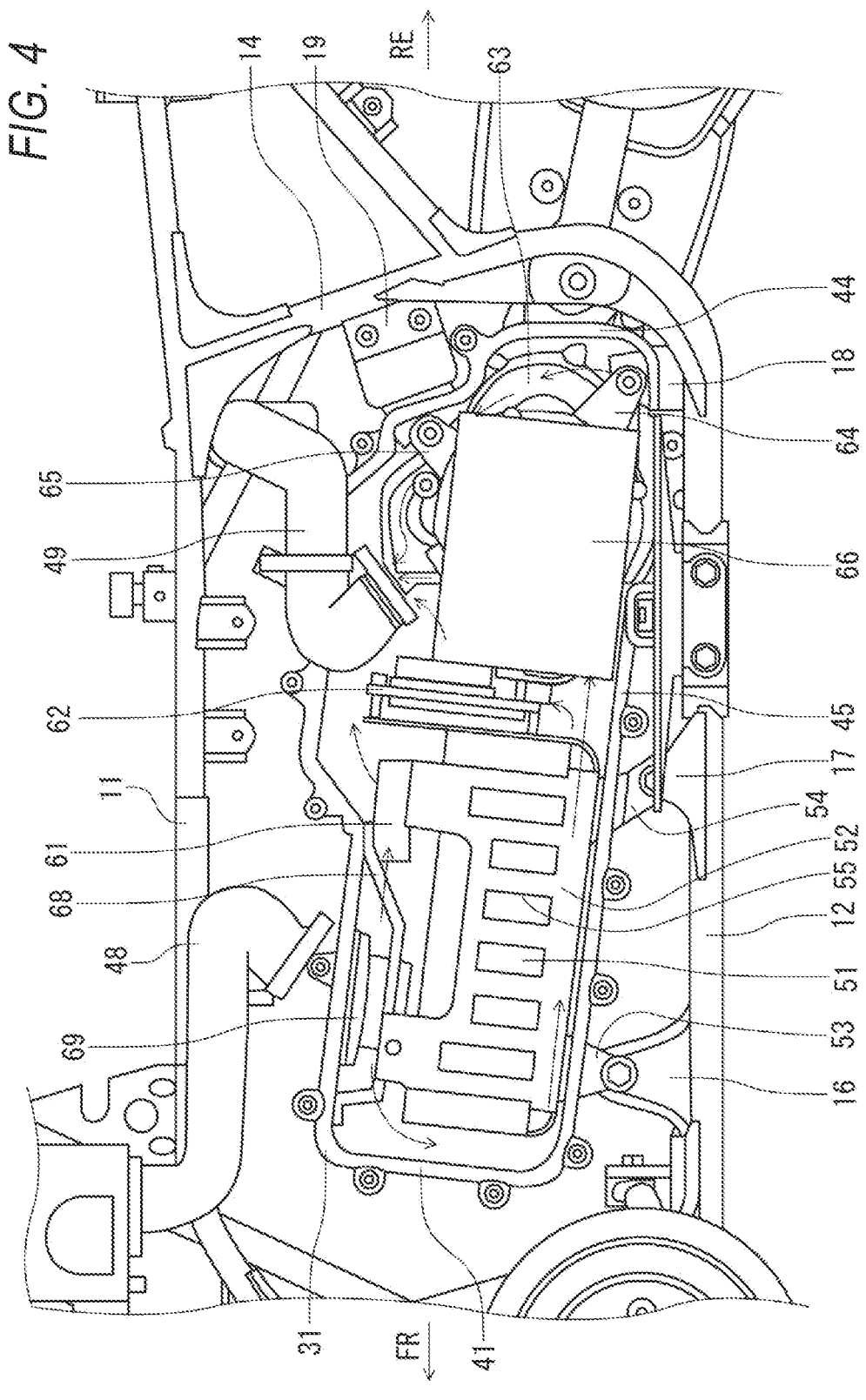
FIG. 4 is a schematic side view showing a flow of cooling air in the electric apparatus according to the present embodiment.
Figure 5:
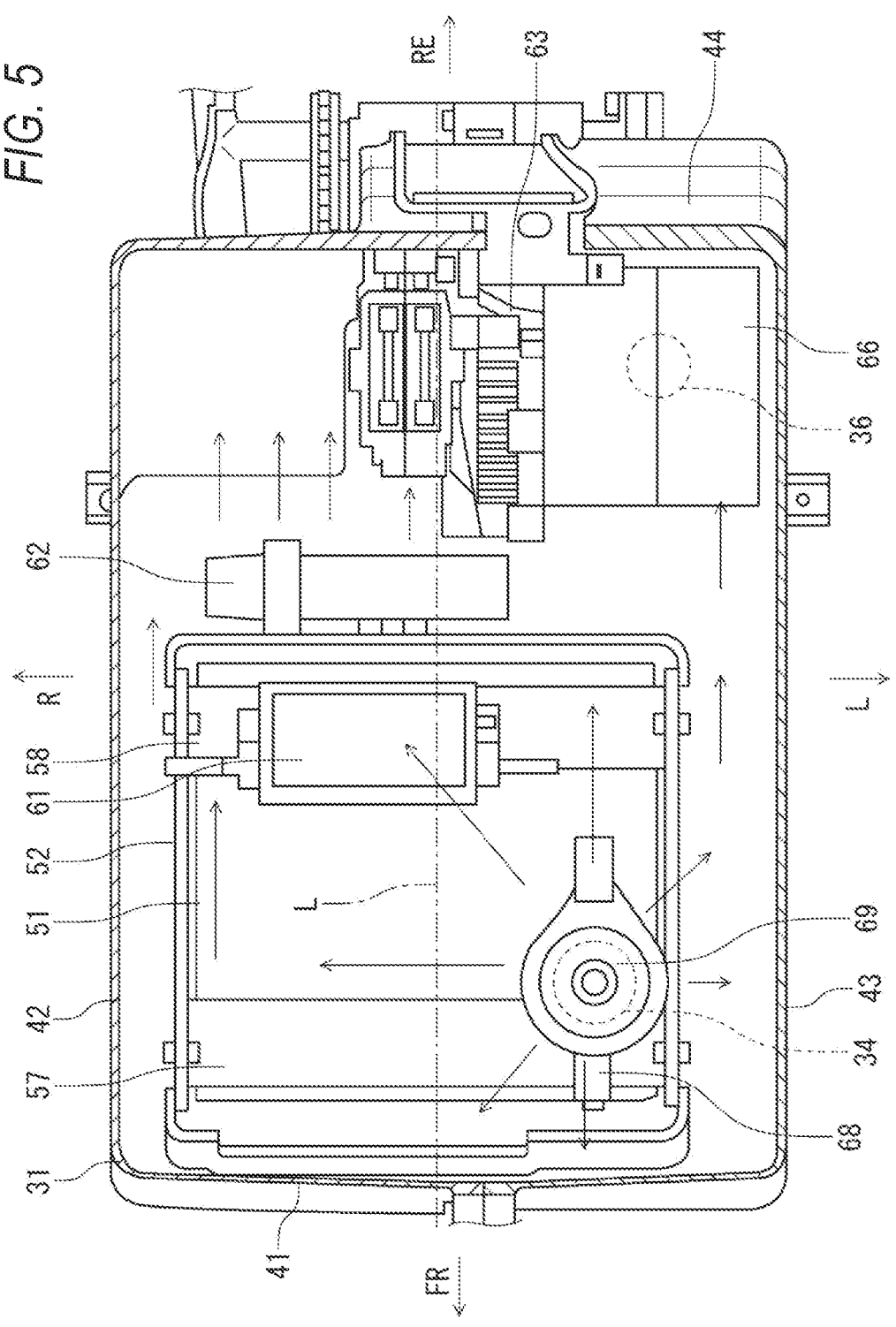
FIG. 5 is a schematic plan view showing the flow of cooling air in the electric apparatus according to the present embodiment.

The layout of the electrical devices and the flow of cooling air will be described with reference to FIGS. 4 and 5. FIG. 4 is a schematic side view showing the flow of cooling air in the electric apparatus according to the present embodiment. FIG. 5 is a schematic plan view showing the flow of cooling air in the electric apparatus according to the present embodiment. FIG. 4 shows a state in which the left case half body is removed from the accommodation case, and FIG. 5 shows a state in which the upper surface of the accommodation case is omitted.

As shown in FIGS. 4 and 5, the battery 51 is installed on the front side of the accommodation space of the accommodation case 31, and the electric motor 63 is installed on the rear side of the accommodation space of the accommodation case 31. The DC-DC converter 61 and the controller 62 are installed in the middle of the accommodation space of the accommodation case 31 in a front-rear direction, and the DC-DC converter 61 and the controller 62 are positioned on a right side with respect to a center line L of the accommodation case 31 extending in the front-rear direction. The inverter 66 is integrated with the electric motor 63, and the inverter 66 is positioned on a left side with respect to the center line L of the accommodation case 31. The intake port 34 (cooling fan 69) and the discharge port 36 are also positioned on the left side with respect to the center line L of the accommodation case 31.

The battery 51 is installed with a gap between the battery 51 and a front wall 41 of the accommodation case 31, and gaps between the battery 51 and a pair of side walls 42, 43 of the accommodation case 31. The intake port 34 overlaps the battery 51 in a plan view, and the cooling air is blown toward the battery 51 from above the battery 51. The cooling air enters a gap between the battery 51 and the front wall 41 of the accommodation case 31 and a gap between the battery 51 and the side walls 42, 43 of the accommodation case 31. Although the battery 51 is held by the battery holder 52, since a front surface of the battery holder 52 is cut out and the plurality of openings 55 are formed in the side surface of the battery holder 52, the battery 51 is effectively cooled by the cooling air.

At this time, the gap between the side wall 43 on the left side of the accommodation case 31 and the battery 51 is formed to be larger than the gap between the side wall 42 on the right side of the accommodation case 31 and the battery 51, and the cooling air easily flows rearward through the gap between the side wall 43 on the left side of the accommodation case 31 and the battery 51. As described above, the intake port 34 is formed at a position deviated to the side wall 43 side (left side) with respect to the center line L of the accommodation case 31, and an air volume of the cooling air flowing from the intake port 34 toward the side wall 43 side increases. Therefore, the cooling air easily hits the inverter 66 having a large amount of heat generation, and the air volume of the cooling air hitting the inverter 66 increases, so that the inverter 66 is effectively cooled.

The DC-DC converter 61 and the controller 62 are installed on the right side, and the inverter 66 is installed near the side wall 43 side on the left side. Therefore, the cooling air flowing from the intake port 34 toward the inverter 66 is not blocked by the DC-DC converter 61 and the controller 62 in front of the inverter 66. The cooling air easily hits the DC-DC converter 61 on the battery 51. Although the controller 62 is installed at the rear surface of the battery holder 52, since the plurality of openings 56 (see FIG. 3) are formed in the rear surface of the battery holder 52, the cooling air is also applied to the controller 62 through the plurality of openings 56.

The inverter 66 is installed with a gap between the inverter 66 and the rear wall 44 of the accommodation case 31, and between the inverter 66 and the side wall 43 of the accommodation case 31. The inverter 66 is effectively cooled by the cooling air that has entered the gap between the inverter 66 and the side wall 43 of the accommodation case 31 and the gap between the inverter 66 and the rear wall 44 of the accommodation case 31. At least a part of the discharge port 36 overlaps the inverter 66 in a plan view, and the cooling air is discharged from above the inverter 66. The cooling air in the accommodation case 31 is easily collected in the inverter 66, and the cooling air is discharged to the outside from the discharge port 36 while hitting the inverter 66, so that the inverter 66 is effectively cooled by the cooling air.

A downstream side of the intake duct 48 is inclined forward and obliquely downward so as to be directed forward as approaching the upper surface of the accommodation case 31. The cooling air easily flows from the intake port 34 to the gap between the battery 51 and the front wall 41 of the accommodation case 31, and the cooling air easily flows over an entire space through the gaps between the battery 51 and the side walls 42, 43 of the accommodation case 31 from the gap on the front side. An upstream side of the discharge duct 49 is inclined forward and obliquely upward so as to be directed forward as receding from the upper surface of the accommodation case 31. The cooling air flows from the gap between the inverter 66 and the rear wall 44 of the accommodation case 31 to the discharge port 36, and the cooling air easily enters the gap between the inverter 66 and the rear wall 44 of the accommodation case 31.

Since the plurality of electrical devices are covered with the accommodation case 31 from the outside, the waterproof property is improved. Although the traveling wind does not hit the electrical devices in the accommodation case 31, the cooling air is taken into the accommodation case 31 by the cooling fan 69. When the cooling air enters the accommodation case 31 from the intake port 34, the cooling air spreads radially above the battery 51. The DC-DC converter 61 is cooled by the cooling air flowing from the intake port 34 toward a right rear side, and the controller 62 is cooled by the cooling air passing through the opening 56 in the rear surface of the battery holder 52. Further, an upper portion of the electric motor 63 is cooled by the cooling air passing through the controller 62.

The cooling air flowing forward from the intake port 34 hits the front wall 41 of the accommodation case 31, and the cooling air flows rearward from the front wall 41 of the accommodation case 31 along a bottom wall 45 and the left and right side walls 42, 43 of the accommodation case 31. The cooling air flowing from the intake port 34 to the left and right sides hits the side walls 42, 43 of the accommodation case 31, and the cooling air flows rearward along the bottom wall 45 and the side walls 42, 43 of the accommodation case 31. The battery 51 is entirely cooled by the cooling air that has entered the gaps between the battery 51 and the front wall 41, the side walls 42, 43, and the bottom wall 45 of the accommodation case 31, and the cooling air that has been blown onto the upper surface of the battery 51 from the intake port 34. In addition, a lower portion of the electric motor 63 is cooled by the cooling air passing through the gap between the battery 51 and the bottom wall 45.

The inverter 66 is cooled by the cooling air passing through the battery 51. As described above, since the gap between the side wall 43 on the left side of the accommodation case 31 and the battery 51 is wide and the intake port 34 and the inverter 66 are positioned on the left side of the accommodation case 31, a large amount of cooling air is easily directed from the intake port 34 to the inverter 66. In addition, the cooling air passing through the battery 51 hits the rear wall 44 of the accommodation case 31, and the cooling air also enters the gap between the inverter 66 and the rear wall 44 of the accommodation case 31. Then, the cooling air passes through the inverter 66 while cooling the inverter 66, and the cooling air is discharged to the outside through the discharge port 36 above the inverter 66.

As described above, according to the present embodiment, the plurality of electrical devices, in particular, the battery 51, the electric motor 63, and the inverter 66 are covered with the accommodation case 31, water intrusion into the battery 51 and the like can be prevented even when the electric vehicle travels on a submerged road or the like. Further, even if the battery 51 and the like are covered with the accommodation case 31, the battery 51 and the like are cooled by the cooling air taken into the accommodation case 31 from the intake port 34. Therefore, it is possible to achieve both a high waterproof property and a high cooling property of the electric apparatus 30.

In the present embodiment, the cooling fan is provided at the intake port of the accommodation case, but the cooling fan may be provided at the discharge port of the accommodation case.

In the present embodiment, the electrical devices such as a battery, a DC-DC converter, a controller, an electric motor, and an inverter are accommodated in the accommodation case, but two or more electrical devices including the electrical drive system may be accommodated in the accommodation case. For example, the electric motor and the inverter may be accommodated in the accommodation case, and the battery, the electric motor, and the inverter may be accommodated in the accommodation case.

In the present embodiment, the electric motor and the inverter are integrated, but the electric motor and the inverter may be formed separately.

In the present embodiment, the downstream side of the intake duct is inclined so as to be directed forward as approaching the upper surface of the accommodation case, but a direction of the downstream side of the intake duct is not particularly limited. For example, the downstream side of the intake duct may face directly downward.

In the present embodiment, the upstream side of the discharge duct is inclined so as to be directed forward as receding from the upper surface of the accommodation case, but a direction of the upstream side of the discharge duct is not particularly limited. For example, the upstream side of the discharge duct may face directly upward.

The electric vehicle is not limited to the ATV, and may be any vehicle that travels by electric power of the battery. For example, the electric vehicle may be an electric straddle-type vehicle. The straddle-type vehicle is not limited to general vehicles in which a rider rides in a posture of straddling a seat, and includes a small-sized scooter type vehicle in which a rider rides without straddling a seat.

As described above, the electric apparatus (30) according to the present embodiment is electric apparatus installed in an electric vehicle (1), and includes a plurality of electrical devices including an electrical drive system and an accommodation case (31) accommodating the plurality of electrical devices, an intake port (34) and a discharge port (36) for cooling air are formed at an upper surface of the accommodation case, and a cooling fan (69) is provided at the intake port or the discharge port. According to this configuration, since the plurality of electrical devices are covered with the accommodation case, water intrusion into each electrical device is prevented even when the electric vehicle travels on a submerged road or the like. In addition, even if the plurality of electrical devices are covered with the accommodation case, each electrical device is cooled by the cooling air taken into the accommodation case from the intake port. Therefore, it is possible to achieve both a high waterproof property and a high cooling property of the electric apparatus.

In the electric apparatus of a straddle-type vehicle according to the present embodiment, the plurality of electrical devices include an electric motor (63) configured to drive the electric vehicle to travel, a battery (51) configured to supply electric power to the electric motor, and an inverter (66) configured to rotationally drive the electric motor. According to this configuration, it is possible to improve a waterproof property and a cooling property with respect to the electric motor, the battery, and the inverter.

In the electric apparatus of the straddle-type vehicle according to the present embodiment, the battery is installed with a gap between the battery and a front wall (41) of the accommodation case, and gaps between the battery and a pair of side walls (42, 43) of the accommodation case, and the intake port overlaps the battery in a plan view. According to this configuration, the cooling air is taken into the accommodation case from above the battery, and the battery is effectively cooled by the cooling air that has entered the gap between the battery and the front wall of the accommodation case and the gap between the battery and the side wall of the accommodation case.

In the electric apparatus of the straddle-type vehicle according to the present embodiment, an intake duct (48) is connected to the intake port, and a downstream side of the intake duct is inclined forward as approaching the upper surface of the accommodation case. According to this configuration, the cooling air easily flows from the intake port to the gap between the battery and the front wall of the accommodation case, and the cooling air easily flows over an entire space through the gap between the battery and the side wall of the accommodation case from the gap on a front side.

In the electric apparatus of the straddle-type vehicle according to the present embodiment, the gap between the battery and one side wall of the accommodation case is larger than the gap between the battery and another side wall of the accommodation case, and the inverter is installed near a side of the one side wall of the accommodation case. According to this configuration, the cooling air easily hits the inverter having a large amount of heat generation, and the inverter is effectively cooled.

In the electric apparatus of the straddle-type vehicle according to the present embodiment, the intake port is formed at a position deviated to the side of the one side wall with respect to a center line (L) of the accommodation case extending in a front-rear direction. According to this configuration, an air volume of the cooling air flowing from the intake port toward the side of the one side wall increases, and the inverter is effectively cooled.

In the electric apparatus of the straddle-type vehicle according to the present embodiment, the inverter is installed with a gap between the inverter and a rear wall (44) of the accommodation case, and a gap between the inverter and the side wall of the accommodation case. According to this configuration, the inverter is effectively cooled by the cooling air that has entered the gap between the inverter and the side wall of the accommodation case and the gap between the inverter and the rear wall of the accommodation case.

In the electric apparatus of the straddle-type vehicle according to the present embodiment, at least a part of the discharge port overlaps the inverter in a plan view. According to this configuration, since the cooling air is discharged from above the inverter, the cooling air is easily collected in the inverter, and the inverter is effectively cooled.

In the electric apparatus of the straddle-type vehicle according to the present embodiment, a discharge duct (49) is connected to the discharge port, and an upstream side of the discharge duct is inclined forward as receding from the upper surface of the accommodation case. According to this configuration, the cooling air flows from the gap between the inverter and the rear wall of the accommodation case to the discharge port, and the cooling air easily enters the gap between the inverter and the rear wall of the accommodation case.

Although the present embodiment has been described, the above-described embodiment and modifications thereof may be combined entirely or partially as other embodiments.

The technique of the present disclosure is not limited to the above-described embodiment, and various changes, substitutions, and modifications may be made without departing from the spirit of the technical idea of the present disclosure. Furthermore, as long as the technical idea can be realized in another way by the progress of the technology or another derivative technology, the present disclosure may be implemented using the method. Accordingly, the claims cover all embodiments that may be included within the scope of the technical idea.

What is claimed is:

1. An electric apparatus installed in an electric vehicle, the electric apparatus comprising:

a plurality of electrical devices including an electrical drive system; and an accommodation case accommodating the plurality of electrical devices, wherein an intake port and a discharge port for cooling air are formed at an upper surface of the accommodation case, and a cooling fan is provided at the intake port or the discharge port, wherein the plurality of electrical devices include an electric motor configured to drive the electric vehicle to travel, a battery configured to supply electric power to the electric motor, and an inverter configured to rotationally drive the electric motor, wherein the battery is installed with a gap between the battery and a front wall of the accommodation case, and gaps between the battery and a pair of side walls of the accommodation case, wherein the intake port overlaps the battery in a plan view, wherein an intake duct is connected to the intake port, wherein a downstream side of the intake duct is inclined forward as approaching the upper surface of the accommodation case, wherein the gap between the battery and one side wall of the accommodation case is larger than the gap between the battery and another side wall of the accommodation case, and wherein the inverter is installed near a side of the one side wall of the accommodation case.

2. The electric apparatus according to claim 1, wherein the intake port is formed at a position deviated to the side of the one side wall with respect to a center line of the accommodation case extending in a front-rear direction.

3. The electric apparatus according to claim 1, wherein the inverter is installed with a gap between the inverter and a rear wall of the accommodation case, and a gap between the inverter and the side wall of the accommodation case.

4. The electric apparatus according to claim 3, wherein at least a part of the discharge port overlaps the inverter in a plan view.

5. The electric apparatus according to claim 4, wherein a discharge duct is connected to the discharge port, and wherein an upstream side of the discharge duct is inclined forward as receding from the upper surface of the accommodation case.

6. An electric apparatus installed in an electric vehicle, the electric apparatus comprising:

a plurality of electrical devices including an electrical drive system; and an accommodation case accommodating the plurality of electrical devices, wherein an intake port and a discharge port for cooling air are formed at an upper surface of the accommodation case, and a cooling fan is provided at the intake port or the discharge port, wherein the plurality of electrical devices include an electric motor configured to drive the electric vehicle to travel, a battery configured to supply electric power to the electric motor, and an inverter configured to rotationally drive the electric motor, wherein the inverter is installed with a gap between the inverter and a rear wall of the accommodation case, and a gap between the inverter and the side wall of the accommodation case, wherein at least a part of the discharge port overlaps the inverter in a plan view, wherein a discharge duct is connected to the discharge port, and wherein an upstream side of the discharge duct is inclined forward as receding from the upper surface of the accommodation case.

* * * * *